United States Patent
Stappaerts et al.

[19]

[11] Patent Number: 5,914,802
[45] Date of Patent: Jun. 22, 1999

[54] COMBINED SPATIAL LIGHT MODULATOR AND PHASE MASK FOR HOLOGRAPHIC STORAGE SYSTEM

[75] Inventors: Eddy A. Stappaerts, Rancho Palos Verdes, Calif.; Watson R. Henderson, Broomfield, Colo.

[73] Assignee: Northrop Grumman Corporation, Los Angeles, Calif.

[21] Appl. No.: 08/896,375

[22] Filed: Jul. 18, 1997

[51] Int. Cl.$^6$ .................................................. G02F 1/01
[52] U.S. Cl. .................................. 359/279; 359/276
[58] Field of Search .............................. 359/279, 11, 290, 359/295, 304, 318, 320; 349/107, 113, 139, 143

[56] References Cited

U.S. PATENT DOCUMENTS

| | | | |
|---|---|---|---|
| 4,566,031 | 1/1986 | Kirk | 358/90 |
| 5,085,973 | 2/1992 | Shimizu et al. | 430/271 |
| 5,187,598 | 2/1993 | Posluszny et al. | 359/29 |
| 5,396,364 | 3/1995 | O'Meara et al. | 359/292 |
| 5,485,312 | 1/1996 | Horner et al. | 359/561 |
| 5,497,254 | 3/1996 | Amako et al. | 359/53 |
| 5,589,955 | 12/1996 | Amako et al. | 359/9 |

*Primary Examiner*—Georgia Epps
*Assistant Examiner*—John Woolner
*Attorney, Agent, or Firm*—Terry J. Anderson; Karl J. Hoch, Jr.

[57] ABSTRACT

A light modulator for both intensity and phase modulating coherent light on a pixel-by-pixel basis includes a modulating material responsive to an electric potential for modulating the intensity of coherent light passing through the modulating material, and electrodes for applying an electric potential across the modulating material on a pixel-by-pixel basis. The coherent light associated with a first set of pixels has a different optical path length through the modulating material than does the coherent light associated with a second set of pixels. The modulating material is a liquid crystal material. The electrodes include a set of first reflective pixel electrodes embedded in the liquid crystal material, the first reflective pixel electrodes having a first thickness, and a set of second reflective pixel electrodes embedded in the liquid crystal material, the second reflective pixel electrodes having a second thickness. The coherent light associated with the first set of pixels is reflected by the first reflective pixel electrodes, and the coherent light associated with the second set of pixels is reflected by the second reflective pixel electrodes. The reflective surfaces of the first reflective pixel electrodes are embedded in the liquid crystal material a different amount than are the reflective surfaces of the second reflective pixels. In particular, the first reflective pixel electrodes are a different thickness than the second reflective pixel electrodes.

13 Claims, 1 Drawing Sheet

COMBINED SPATIAL LIGHT MODULATOR AND PHASE MASK FOR HOLOGRAPHIC STORAGE SYSTEM

BACKGROUND OF THE INVENTION

The present invention relates to storage systems for holographic data and images. More specifically, the present invention relates to spatial light modulators for use in storing holographic data and images.

Holography is a lensless, photographic method that uses coherent (laser) light to produce three-dimensional images by splitting the laser beam into two beams and recording on a storage medium, such as a photographic plate, the interference patterns made by the reference light waves reflected directly form a mirror, and the waves modulated when simultaneously reflected from the subject.

In a holographic data/image storage system, the information to be stored is written into the storage medium with a spatially varying light intensity produced by the coherent interference between an information (object) beam and a reference beam. Details of this process are well understood and described in the literature. See, for example, J. Goodman, *Introduction to Fourier Optics*, Chapter 8 (McGraw-Hill, 1968).

Data is encoded onto the information beam by spatially modulating the intensity of the beam. A common method for intensity modulation is to use a two dimensional array of elements (pixels) in which the properties of the individual pixels are varied to control the ratio of the light transmitted or reflected to that incident on the pixel. Such a device is known as a spatial light modulator (SLM). Methods to achieve these objectives are well known and documented. See, for example, U. Efron (Ed.), *Spatial Light Modulators* (Dekker, 1994).

FIG. 1 is a cross-sectional view of a portion of a single row of pixels of a liquid crystal reflective spatial light modulator (SLM) of a known type.

The SLM is formed on a silicon substrate 20. Integrated electronics 22 are formed on the silicon substrate using conventional semiconductor planar processes. An element of the integrated electronics 22 corresponds to each pixel of the SLM array. An individual pixel electrode 24 is electrically connected to be driven by a corresponding element of the integrated electronics 22.

Liquid crystal material 32 covers the pixel electrodes 24. A layer of SLM cover glass 38 contains the liquid crystal material. A conducting layer 36 covers the underside of the cover glass 38. An electric field can then be produced across the liquid crystal material at a particular pixel by applying an electric potential between the particular pixel electrode 24 and the conducting layer 36. The electric potential for a particular pixel is controlled by the element of the integrated electronics 22 associated with that pixel electrode 24. The potential across the liquid crystal material 32 at a particular driven pixel electrode 24 causes the liquid crystal material to modulate the light beam at that pixel.

A polarizer 40 polarizes the incoming light beam 51. After being polarized by the polarizer 40, the incoming light beam passes through the SLM cover glass 38 and traverses the liquid crystal material 32. The light beam is reflected by the driven pixel electrode 24, reversing its path as reflected beam 53. The reflected beam 53 passes back through the liquid crystal material and the cover glass 38 to impinge the polarizer 40.

The optical axes of the liquid crystal material 32 are oriented so that the reflected light 53 is polarized orthogonally to the incoming beam 51. The orthogonal polarization of the reflected beam 53 causes the reflected beam 53 to be reflected by the polarizer 40, rather than passing through it. The reflected beam 53 is directed toward the storage medium (not shown).

A liquid crystal alignment layer 34 may be included between the liquid crystal material 32 and the cover glass conducting layer 36. The liquid crystal alignment layer provides alignment to the liquid crystal modulator medium.

Those skilled in the art understand that the performance of a holographic storage system may be improved by randomizing the phase of the information beam. See, for example, J. Hong, et al., "Influence of Phase Masks on Cross Talk in Holographic Memory," *Optics Letters*, Vol. 21, No. 20, Pp. 1694–96 (Oct. 15, 1996).

A phase mask is typically used to change the phase of the information beam and accomplish such randomization. The phase mask is placed in the path of the reflected modulated beam 53. The phase mask is constructed and aligned in the reflected modulated light beam 53 to provide a particular phase value to each pixel of the modulated information beam. Thus, the distribution of the phase values in the phase mask corresponds to the distribution of the phase of the information beam. To create a particular phase distribution in the information beam, the phase values are distributed across the phase mask in a corresponding pattern. If a random phase distribution pattern is desired in the information beam, phase values may be randomly distributed across the phase mask.

Binary phase values of 0 and $\pi$ may be distributed in a random manner across the array to generate the randomization of the information beam. Those skilled in the art will recognize that other phase values may be used to generate the appropriate randomization, or that other phase patterns may be desired in the information beam.

Each phase value applied to the information beam by the phase mask must be accurately aligned with the associated pixel of the reflected modulated beam 53. Therefore, the spatial light modulator (SLM) and the phase mask must be carefully aligned. Misalignment of the SLM and the phase mask pixels results in increased cross-talk between detector array pixels during readout of the storage medium. It has been found that in an arrangement with a ten micron pixel pitch, the alignment between the SLM pixels and the phase mask pixels should be kept to about one tenth of a micron.

SUMMARY OF THE INVENTION

A light modulator for both intensity and phase modulating coherent light on a pixel-by-pixel basis includes a modulating material responsive to an electric potential for modulating the intensity of coherent light passing through the modulating material, and electrodes for applying an electric potential across the modulating material on a pixel-by-pixel basis. The coherent light associated with a first set of pixels has a different optical path length through the modulating material than does the coherent light associated with a second set of pixels.

The modulating material is a liquid crystal material. The electrodes include a set of first reflective pixel electrodes embedded in the liquid crystal material, the first reflective pixel electrodes having a first thickness, and a set of second reflective pixel electrodes embedded in the liquid crystal material, the second reflective pixel electrodes having a second thickness. The coherent light associated with the first set of pixels is reflected by the first reflective pixel electrodes, and the coherent light associated with the second set of pixels is reflected by the second reflective pixel electrodes.

The reflective surfaces of the first reflective pixel electrodes are embedded in the liquid crystal material a different amount than are the reflective surfaces of the second reflective pixels. In particular, the first reflective pixel electrodes are a different thickness than the second reflective pixel electrodes.

An object of the present invention is to provide a reflective spatial light modulator and a phase mask with precision registration for use in a holographic storage system.

An object of the present invention is to provide a reflective spatial light modulator and phase mask with improved alignment between the pixels of the spatial light modulator and the pixels of the phase mask.

An object of the present invention is to provide permanent alignment or registration between the spatial light modulator and the phase mask.

An object of the present invention is to provide an integrated phase mask and reflective spatial light modulator.

An object of the present invention is to form a reflective spatial light modulator and phase mask together for improved registration.

An object of the present invention is to provide a spatial light modulator and a phase mask in which the pixels are permanently aligned.

An object of the present invention is to provide a reflective spatial light modulator and phase mask that can be readily manufactured.

An object of the present invention is to provide a reflective spatial light modulator and phase mask that can be accurately manufactured using conventional manufacturing techniques.

An object of the present invention is to provide a reflective spatial light modulator and phase mask that has relatively low manufacturing costs.

DETAILED DESCRIPTION OF THE PREFERRED EMBODIMENT

Figure 1:
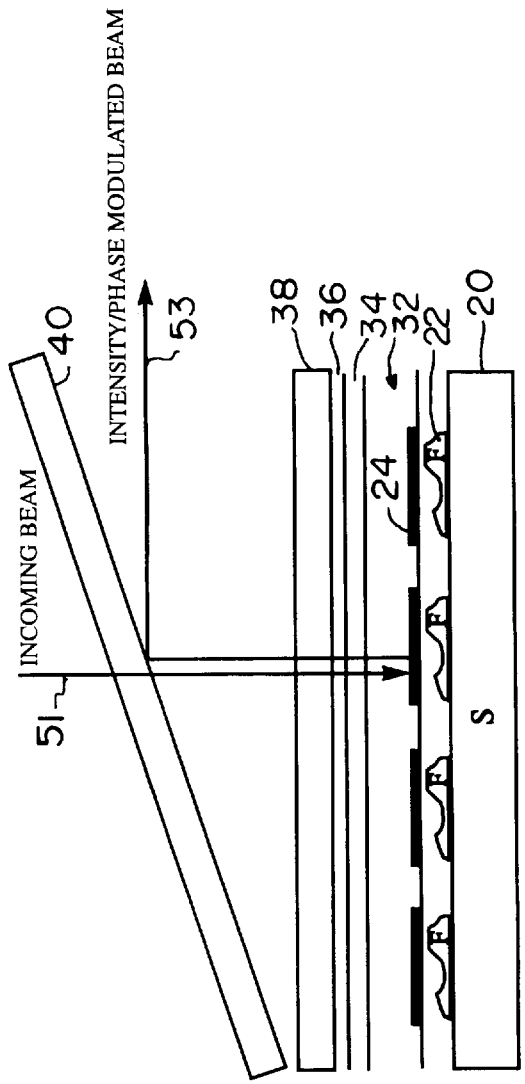
FIG. 1 is a cross sectional view of a portion of one row of pixel electrodes of a reflective spatial light modulator of a known type.
Figure 2:
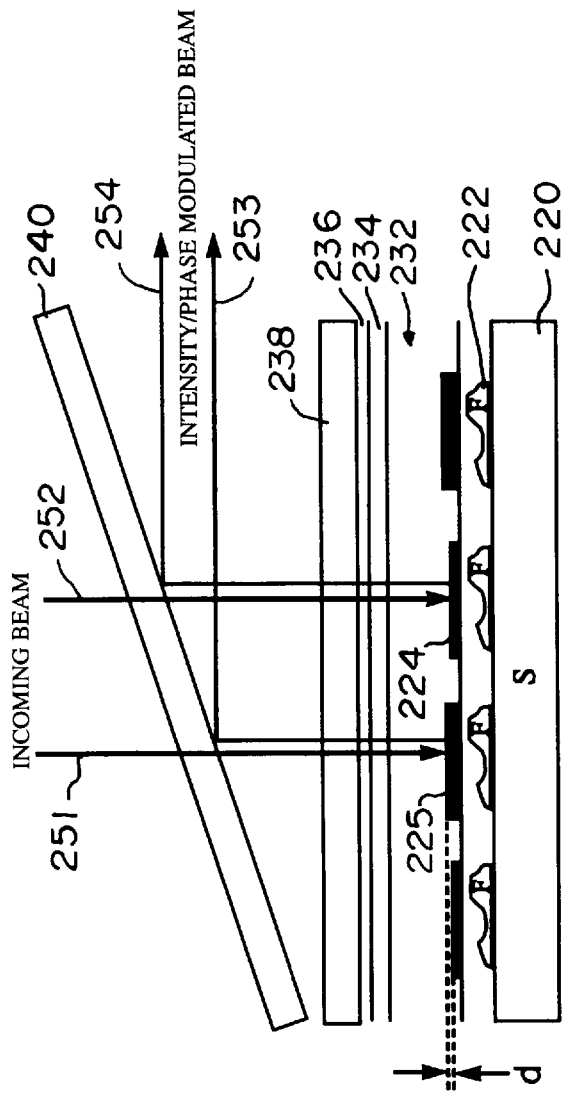
FIG. 2 is a cross sectional view of a portion of one row of pixel electrodes of a combined spatial modulator and phase mask constructed according to the invention.

A cross section of a small portion of a single row of pixels of a spatial light modulator and phase mask constructed according to the invention is shown in FIG. 2. Several of the elements are similar to the corresponding elements in the known type of reflective spatial light modulator shown in FIG. 1.

The combined SLM and phase mask is formed on a silicon substrate 220. Integrated electronics 222 are formed on the silicon substrate using conventional semiconductor planar processes. An element of the integrated electronics 222 corresponds to each pixel of the SLM array. Each individual pixel electrode 224, 225 is electrically connected to be driven by a corresponding element of the integrated electronics 222.

Liquid crystal material 232 covers the pixel electrodes 224, 225. A layer of SLM cover glass 238 contains the liquid crystal material. A conducting layer 236 covers the underside of the cover glass 238. An electric field can then be produced across the liquid crystal material at a particular pixel by applying an electric potential between the particular pixel electrode 224, 225 and the conducting layer 236. The electric potential for a particular pixel is controlled by the element of the integrated electronics 222 associated with that pixel electrode 224, 225. The potential across the liquid crystal material 232 at a particular pixel electrode 224, 225 causes the liquid crystal material to modulate the intensity of the light beam at that pixel.

In accordance with the illustrated embodiment of the invention, the phase mask is integrated with the SLM by providing reflective pixel electrodes 224, 225 in the liquid crystal material that provide different length optical paths through the liquid crystal material for light reflected from the pixels 224 than from the pixels 225. The reflective surface of the pixel 225 is embedded into the liquid crystal material a different amount than is the reflective surface of the pixel 224.

The different positioning of the reflective surfaces of the pixels 224, 225 may be achieved by using pixel electrodes 224, 225 of different thicknesses. The optimal difference between the thickness of the thinner electrodes 224 and the thicker electrodes 225 depends on the type of liquid crystal material 232. For example, the thickness difference will be different if nematic liquid crystal material is used than if ferro-electric liquid crystal material is used.

For example, for a binary phase mask in which phase values of 0 and $\pi$ are to be applied to the pixels, the difference in thickness between the thin pixel electrode 224 and the thicker pixel electrode 225 may be $\lambda/4n$, in which $\lambda$ is the optical wavelength of the incoming light beam 251 in a vacuum, and n is the average refractive index of the liquid crystal material 232.

A polarizer 240 polarizes the incoming light beam 251, 252. After being polarized by the polarizer 240, the incoming light beam passes through the SLM cover glass 238 and traverses the liquid crystal material 232. The light beam is reflected by the driven pixel electrodes 224, 225, reversing its path as reflected beam 253, 254. The reflected beam 253, 254 passes back through the liquid crystal material and the cover glass 238 to impinge the polarizer 240.

The light reflected from the top of the thinner pixel electrode 224 travels through the liquid crystal material 232 a distance greater than the light reflected from the top of the thicker pixel electrode 225. In particular, the light reflected from the thinner electrode 224 has traveled a distance greater by twice the difference in thickness between the thinner electrode 224 and the thicker electrode 225. Thus, the length of the optical path through the liquid crystal material for light reflected by the thicker pixel electrode 225 is shorter than the optical path through the liquid crystal material for light reflected by the thinner pixel electrode 224.

The difference between the thickness of the thinner pixel electrode 224 and the thickness of the thicker pixel electrode 225 may be considered to be d. The portion of the incoming beam 252 that is reflected by the thinner pixel electrode 224 to become reflected beam 254 travels 2 d farther through the liquid crystal material than does the portion of the incoming beam 251 that is reflected by the thicker pixel electrode 225 to become the reflected beam 253.

Because the reflected beam portions 253, 254 have traveled different length optical paths through the liquid crystal material, they have different phases. The phase difference is determined by the difference in thickness between pixel electrodes 224, 225. Thus, the reflected beams 253, 254 have been both intensity and phase modulated. A separate phase mask is not necessary.

Phase randomization of the light beam is achieved by randomly distributing the different thickness pixel electrodes 224, 225 across the SLM array. Those skilled in the art will recognize that other distribution of phase values may be used. In addition, the different thickness pixel electrodes may be arranged in any spatial pattern to achieve a corresponding spatial distribution of phase values.

Those skilled in the art will recognize that other phase values may be used to generate the appropriate randomization, or other phase patterns are desired in the information beam. Different phase values may be obtained by varying the differences in thickness between the pixel electrodes. In addition, more than two phase values may be used. More than two phase values may be obtained by using pixel electrodes of more than two different thicknesses.

The optical axes of the liquid crystal material 232 are oriented so that the reflected and phase shifted light 253, 254 is polarized orthogonally to the incoming beam 251, 252. The orthogonal polarization of the reflected beam 253, 254 causes the reflected beam 253, 254 to be reflected by the polarizer 240, rather than passing through it. The reflected beam 253, 254 is directed toward the storage medium (not shown).

The electric potential between a particular electrode 224, 225 and the ground plane 236 may be adjusted to compensate for the difference in spacing between 1) the top of the electrode 224 and the ground conducting layer 236, and 2) the top of the electrode 225 and the ground plane 236. Such adjustment may be necessary to preserve the proper intensity modulation on the beam.

A liquid crystal alignment layer 234 may be included between the liquid crystal material 232 and the cover glass conducting layer 236. The liquid crystal alignment layer provides alignment to the liquid crystal modulator medium.

The combined SLM and phase mask may be manufactured using conventional planar semiconductor manufacturing techniques. Registration of the phase mask and the SLM is accomplished during fabrication. That allows the use of conventional highly developed photolithographic techniques to produce the desired pattern by either additive or subtractive manufacturing processes.

The phase mask pixels and the SLM pixels of the combined modulator and phase shifter described above are permanently aligned with one another. Because they are manufactured together in the same silicon manufacturing process, permanent alignment is assured.

Both the path length differences for the beams 251/253 and 252/254, and the registration may be measured at the wafer stage of the manufacturing process. At that stage, rework or rejection of individual SLM wafers may take place, before the expensive assembly operations that are necessary to produce a fully functional SLM. Therefore, the expensive assembly operations may be avoided on wafers that are out of specification. Out of specification performance may be detected and corrected before a fully functional SLM is constructed. That will reduce overall manufacturing costs for spatial light modulators.

While a preferred embodiment of the invention has been described herein, it will be appreciated that a number of modifications and variations will suggest themselves to those skilled in the pertinent arts. These variations and modifications that may suggest themselves should be considered within the spirit and scope of the present invention, as defined in the claims that follow.

What is claimed is:

1. A light modulator for intensity and phase modulating coherent light on a pixel-by-pixel basis, the modulator comprising:

a modulating material responsive to an electric potential for modulating the intensity of coherent light passing through the modulating material; and electrodes for applying an electric potential across the modulating material on a pixel-by-pixel basis, the electrodes including:
  a) a first set of first reflective pixel electrodes embedded in the modulating material, the first reflective pixel electrodes having a first thickness; and
  b) a set of second reflective pixel electrodes embedded in the modulating material, the second reflective pixel electrodes having a second thickness;
  c) wherein the first thickness is different than the second thickness;

wherein the coherent light associated with a first set of pixels has a different optical path length through the modulating material than does the coherent light associated with a second set of pixels.

2. The light modulator of claim 1, wherein the modulating material is a liquid crystal material.

3. The light modulator of claim 2, wherein the reflective surfaces of the first reflective pixel electrodes are embedded in the liquid crystal material a different amount than are the reflective surfaces of the second reflective pixels.

4. A spatial light modulator comprising:

modulating material responsive to an electric potential for modulating the intensity of light passing through the modulating material; and first and second reflective electrodes embedded in the material, the first reflective electrode having a first thickness and the second reflective electrode having a second thickness, different from the first thickness, wherein the first reflective electrode is positioned so that light passing through the modulating material and impinging the first reflective electrode travels through less of the modulating material than does light passing through the modulating material and impinging the second reflective electrode.

5. The spatial light modulator of claim 4, wherein the modulating material is a liquid crystal material.

6. The spatial light modulator of claim 5, additionally comprising integrated electronics coupled to the first and second reflective electrodes for individually establishing an electric potential across the liquid crystal material at each of the reflective electrodes/

7. The spatial light modulator of claim 6, wherein the first and second reflective electrodes comprise electrodes formed on the integrated electronics.

8. The spatial light modulator of claim 4 for use with light to be modulated by the liquid crystal material having wavelength $\lambda$ in a vacuum, and wherein the liquid crystal material has an average refractive index n, wherein the difference between the first thickness and the second thickness is approximately $\lambda/4n$.

9. A combined spatial light modulator and phase mask for a holographic storage system, comprising:

a plurality of first reflective pixel electrodes, each of which is individually activatable, and each of which has a first thickness;

a plurality of second reflective pixel electrodes, each of which is individually activatable, and each of which has a second thickness different from the first thickness; and a liquid crystal material covering the first and second reflective pixel electrodes so that the optical path of light reflected by the first reflective pixel electrodes is of a different length than the optical path of light reflected by the second reflective pixel electrodes.

10. The combined spatial light modulator and phase mask of claim 9, additionally comprising:

a conducting layer adjacent the liquid crystal material opposite the first and second reflective pixel electrodes; and integrated electronics connected to the first and second reflective pixel electrodes for individually activating the reflective pixel electrodes and creating an electric potential between the activated pixel electrode and the conducting layer.

11. A combined spatial light modulator and phase mask for a holographic storage system, comprising:

a semiconductor substrate;

integrated electronics formed on the semiconductor substrate;

a plurality of first reflective pixel electrodes, each of which is connected to the integrated electronics to be individually activatable, and each of which has a first thickness;

a plurality of second reflective pixel electrodes, each of which is connected to the integrated electronics to be individually activatable, and each of which has a second thickness, different from the first thickness;

a layer of liquid crystal material covering the first and second reflective pixel electrodes, wherein the liquid crystal material has an index of refraction n;

a cover glass over the layer of liquid crystal material;

a conducting layer on the cover glass connected so that an electric potential is created between each activated pixel electrode and the conducting layer; and a polarizer for polarizing an incoming coherent light beam of wavelength $\lambda$ before the light enters the cover glass, wherein the polarizer is arranged at an angle relative to the first and second reflective pixel electrodes to reflect toward a target light reflected by the reflective pixel electrodes.

12. The combined spatial light modulator and phase mask of claim 11, wherein the difference between the first thickness and the second thickness is $\lambda/4n$.

13. A combined spatial light modulator and phase mask providing electrically variable intensity control and static phase control of a narrowband laser beam, the device comprising:

a plurality of first reflective pixel electrodes, each of which has a first thickness;

a plurality of second reflective pixel electrodes, each having a second thickness, different from the first thickness; and a liquid crystal material covering the first and second reflective pixel electrodes so that the optical path of light reflected by the first reflective pixel electrodes is of a different length than the optical path of light reflected by the second reflective pixel electrodes;

wherein the liquid crystal material is connectible to an electrical source to vary the intensity of the reflected light in response to electrical signals applied to the liquid crystal materials; and wherein the different thickness pixel electrodes result in a corresponding difference of phase values of the reflected light.

* * * * *